Dec. 19, 1961 R. A. BRUNSON 3,014,172

TRANSISTORIZED INVERTERS

Filed March 18, 1957

INVENTOR.
RALPH A. BRUNSON

BY
Reynolds, Beach & Christensen

ATTORNEYS 3,014,172
TRANSISTORIZED INVERTERS

Ralph A. Brunson, Mercer Island, Wash., assignor to Boeing Airplane Company, Seattle, Wash., a corporation of Delaware Filed Mar. 18, 1957, Ser. No. 646,676
4 Claims. (Cl. 321—27)

This invention relates to improvements in electrical inverter circuits and particularly those of the transistor oscillator type by which a relatively low direct voltage may be converted into an alternating voltage of relatively high amplitude. The invention is herein illustratively described by reference to the presently preferred form thereof adapted for miniature circuit techniques; however, it will be evident that the invention is not necessarily limited with respect to illustrated details of form, arrangement and application except as defined in the appended claims.

A broad object of the invention is to provide a transistorized inverter of relatively high power capacity, and specifically one of relatively low cost, which is adapted for using ordinary production-run, relatively inexpensive transistors.

A more specific object is to provide such a circuit wherein a plurality of such transistors may be connected in parallel in order to carry load current, without introducing a large unbalance in the loading of the transistors due to unavoidable differences between the ratios of their input impedances to inverter transformer feedback winding impedance. Stability against the adverse effects of temperature and transistor aging causing changes of transistor impedance is a further objective.

Still another object is a high-efficiency voltage multiplying inverter circuit; particularly such a circuit which is adapted for miniaturization, using transistors and specially constructed low-loss high-frequency transformer means of minimum size and weight.

There are numerous applications for small but efficient electronic inverters by which direct voltage of low magnitude may be converted into alternating voltage of relatively high amplitude, either for use as alternating voltage or for rectification into direct voltage of high magnitude. Transistors are particularly useful in these circuits because of the ability of a transistor to carry relatively heavy current with low voltage drop across it. In their preferred forms these circuits are essentially oscillators using a transformer type feedback and output coupling arrangement. However, as is well known, transistors of the so-called "power type" capable of carrying heavy load currents are quite expensive to produce and not readily available. Therefore, it is desirable to parallel a number of relatively inexpensive low-power transistors in order to provide a total effective load capacity equivalent to that of one or more power type transistors. However, attempts to do so employing the conventional arrangement of paralleled amplifiers driven by a common feedback circuit led to serious difficulties. The resulting circuits exhibited much lower efficiency and total load capacity than was to be expected. Moreover, replacement of transistors in many cases materially altered the circuit power rating and efficiency.

It was discovered in accordance with this invention that attempts to use conventionally paralleled transistors in the above-mentioned arrangement usually resulted in one transistor taking much more or less than its proper divisional share of load. It was learned that even slight differences in input impedance of the transistors produced exaggerated differences in load current assumed thereby. Consequently, the load capacity of the inverter, attainable without overloading one or more transistors, was correspondingly reduced. Since production-run transistors are rarely identical in their impedance characteristics replacements of transistors was also a problem.

The present invention, overcoming these difficulties, comprises a push-pull oscillator circuit including two or more of pairs of transistors. The paralleling of transistors on each side of the circuit is confined to the load electrodes thereof, whereas in the illustrated embodiment their feedback or control electrodes are connected in separate feedback loops each including an electrically separate feedback winding on the transformer. In accordance with another feature of the invention, each transistor is paired with a similar transistor on the opposite side of the circuit for bias purposes, by employing a common bias resistance through which interconnected opposite-polarity ends of the pair of transformer feedback windings associated with the transistor pair are connected to the negative side of the direct voltage source. Thus bias for the transistors of each pair is represented by the voltage drop in the common bias resistance which is proportional to the average quiescent current flowing through the control electrodes of both transistors. Of significance, however, is the fact that variations in the voltage drop across the common bias resistance caused by feedback currents flowing through the control electrodes of the paired transistors are substantially eliminated, because as the feedback current is on the increase in one such transistor it is simultaneously on the decrease in the other transistor. Accordingly, degenerative action is avoided even without use of a filter condenser or the like connected across the bias resistance, and it becomes possible to develop the necessary amplitude of positive feedback signals to sustain circuit oscillation with feedback windings having relatively few turns.

It will be recognized that while the invention is primarily directed to the provision of an inverter circuit capable of using paralleled ordinary production-run transistors having unavoidable impedance differences, still it is also suitable for use with carefully matched transistors as well as for transistors of the power type. Even if the transistors are initially matched they may age differently or respond differently to temperature changes. Moreover, replacement of a transistor by another may be difficult or impossible if identical impedance characteristics are mandatory. Therefore the principles of the invention have broader utility than in the cited illustration.

These and other features, objects and advantages of the invention will become more fully evident from the following description thereof by reference to the accompanying drawings.

Figure 1:
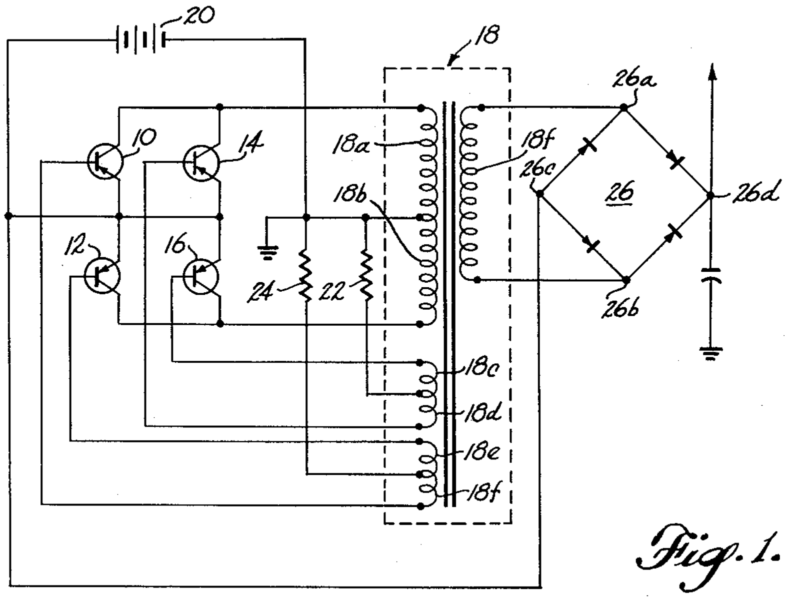
FIGURE 1 is a schematic circuit diagram of the invention in its preferred form.

In its illustrated form the novel inverter comprises an oscillation circuit including a pair of transistors 10 and 12, a second pair of transistors 14 and 16, an output transformer 18 and a direct voltage source 20. The transformer 18 has two primaries 18_a_ and 18_b_ formed by center-tapping a single winding. A first pair of feedback windings 18_c_ and 18_d_ are formed by center-tapping a separate winding whereas a second pair of feedback windings 18_e_ and 18_f_ are likewise formed by center-tapping a separate winding. Output alternating voltage is developed across the transformer secondary 18_f_ during self-sustained oscillations in the circuit.

In this example the emitter and collector electrodes of the transistors serve as their load electrodes. The collectors of transistors 10 and 14 are connected to the outer or free end of primary winding 18*a* whereas the emitters of these transistors are connected to the positive terminal of direct voltage source 20. The negative terminal of the direct voltage source is connected to the common end of the primaries 18*a* and 18*b* and is grounded as shown. Similarly the corresponding load electrodes of transistors 12 and 16 are connected in parallel and together in series with the direct voltage source 20 and the transformer primary 18*b*. Thus, quiescent direct current is permitted to flow through the transistors load electrodes and transformer primaries with a polarity relationship in the latter causing mutual cancellation of magnetizing force in the transformer. By a self-biasing arrangement hereinafter described the amount of quiescent current permitted to flow is kept very small so as to minimize energy losses in the circuit.

The emitter and base electrodes of the transistors comprise the control electrodes thereof and the emitter is the common or reference electrode. Obviously a common base connection may be used in the alternative, with the collector still serving as the power electrode. A shown, the base of transistor 10 is connected to the free or outer end of feedback winding 18*f* whereas the bases of transistors 12, 14 and 16 are similarly connected to the corresponding ends of feedback windings 18*e*, 18*d*, and 18*c*, respectively. The common ends of windings 18*c* and 18*d* are connected to ground, i.e., the negative terminal of source 20, through a common bias resistance 22 while the common ends of windings 18*e* and 18*f* are similarly connected to ground through the common bias resistance 24. Thus, direct current flows through bias resistance 22 representing the total quiescent current flowing through the control electrodes of transistors 14 and 16. Likewise, direct current flows through bias resistance 24 representing the total of quiescent current flow through the control electrodes of transistors 10 and 12. The transformer magnetizing forces produced by such direct currents flowing through the feedback windings of each pair associated with the respective pairs of transistors act in mutual opposition due to the polarities of the transformer winding connections.

The polarities of the circuit connections are such that feedback currents are applied to the transistors by the respective pairs of feedback windings on the transformer in proper phase relationship to sustain oscillations in the circuit. Transistors 10 and 14 are driven in phase while transistors 12 and 16 are driven in phase, but 180 degrees out of phase with transistors 10 and 14. Thus as transistors 10 and 14 are being driven toward saturation by feedback through transformer 18, transistors 12 and 16 are being driven progressively toward cut-off. When finally the rate of increase of current in transistors 10 and 14 starts to drop, the induced positive feedback voltages in windings 18*d* and 18*f* drop off accordingly, further decreasing the rate of increase of current in these transistors, until finally the current in transistors 10 and 14 begins to decrease. When this occurs the second half of the cycle of oscillations is underway. The process repeats itself continuously with the roles of the transducers on opposite sides of the push-pull circuit being alternately reversed.

The resulting alternating voltage appearing across the transformer secondary 18*f* as a result of pulsating direct current flow through the respective primaries 18*a* and 18*b* with opposite phasing may be used directly as alternating voltage or may be rectified as in the illustrated case. Rectification of the transformer secondary voltage takes place in the bridge rectifier 26. The rectifier bridge opposing junctions 26*a* and 26*b* are connected to the respective ends of the transformer secondary. The intermediate junctions 26*c* and 26*d* may serve as direct voltage output terminals as such, or may be connected in the illustrated modified arrangement wherein the junction 26*c* is connected to the positive terminal of direct voltage source 20 whereas the junction 26*d* serves as one output terminal of the circuit, with the remaining output terminal comprising the negative side of the direct voltage source 20, or ground. A filter condenser 28 connected between junction 26*d* and ground smooths the output voltage from the circuit. With this modified arrangement, the output direct voltage represents the sum of the rectified transformer secondary voltage and the voltage of source 20, a desirable feature wherein maximum attainable output voltage is desirable, particularly where the filtering requirements are to be minimized. Filtering is minimized in this modified arrangement inasmuch as no filtering is required with respect to the component of direct voltage represented by the voltage source 20.

A distinct and unique advantage of employing separate feedback windings for the individual transistors resides in the relative independence of load assumption by the paralleled transistors. The load current which any transistor assumes is determined by the input impedance of that transistor in relation to the internal impedance of the feedback winding connected to its control electrodes, and is substantially independent of the input impedance of the transistor paralleled with it. The transistors may therefore be paralleled as shown without the former probability that, because of impedance mismatch, one would be greatly overloaded in relation to the other, and thereby unduly limit the total load capacity of the circuit as well as lower its efficiency. As a result, it is possible to parallel ordinary production-run transistors without special regard to selecting transistors which have identically matched impedance characteristics.

The use of a common feedback resistance (22 or 24) for each pair of transistors is made possible by connecting opposite-polarity ends of the control windings of each pair together. A unique advantage of so doing is the reduction of the number of turns required on each feedback winding to develop the necessary feedback voltage for driving the transistors. If separate feedback resistances were employed with each transistor, the degenerative effect of the bias resistance on control current would require the feedback windings to develop a relatively high feedback voltage in order to drive the transistors. However, with the illustrated arrangement when the feedback current flowing through the control electrodes of one transistor is increasing, for example, that flowing through the control electrodes of the other transistor in the same pair is correspondingly decreasing so that there is very little change in the amount of current flowing through the common bias resistance for the two transistors. This eliminates the degenerative action which the bias resistance would otherwise produce.

Figure 2:
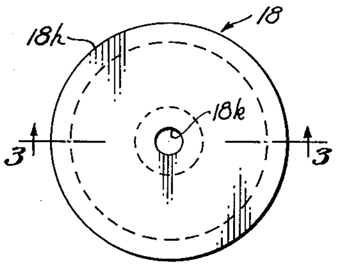
FIGURE 2 is a top view of a cup-core transformer employed in a miniaturized form of the invention.
Figure 3:
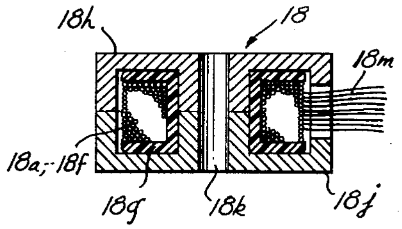
FIGURE 3 is a transverse sectional view on line 3—3 in FIGURE 2.

The invention lends itself very well to miniaturization by virtue of its use of transistors. In order to miniaturize the circuit, as for printed circuit applications, it is desirable to employ miniature transformers capable of operating at relatively high frequencies with minimum energy losses. A suitable transformer for this purpose is illustrated in FIGURES 2 and 3, and possesses the windings schematically shown in FIGURE 1. In this transformer the various windings 18*a* to 18*f* are wound on a plastic or dielectric bobbin 18*g* having a central opening. Two similar cup-shaped transformer core members 18*h* and 18*j* have complementary annular grooves which accommodate the bobbin 18*g* when the core members are placed together in alignment as shown. A central bore 18*k* through the core members is adapted to pass a mounting screw by which the transformer is fastened to a printed circuit board, the mounting screw serving the additional function of holding the transformer parts together in operative relationship. A side aperture 18*m* formed by complemental recesses in the mating edges of the core members passes the ends of the windings to serve as connecting leads for the circuit.

The core members 18*h* and 18*j* are preferably formed of a sintered magnetic material of crystalline form known commonly as "ferrite." Such materials are well known and are incorporated in suitable miniature cup-core formations manufactured by such companies as Ferroxcube Corp. of America of Saugerties, New York, and General Ceramics Company of Keasbey, New Jersey. Transformers using these cup-cores are capable of sustaining alternating voltages of very high frequencies (5 kc. and up) with very low core losses. Consequently, miniaturized converter or inverter circuits employing the present invention may be made to perform with very high efficiency and to produce relatively high amplitude alternating voltages from relatively low magnitude direct voltages. It will be recognized, however, that the invention is not necessarily confined to miniature circuit or printed circuit applications but is applicable to any transistorized converter or inverter circuit application wherein the novel principles disclosed may be employed.

In a typical application of the invention in its illustrated form four 2N107 transistors were employed. The bias resistances 22 and 24 were 1.5K resistors and the source 20 was a 6 volt battery. With one miniature cup-core transformer 18 manufactured by the first-mentioned company and IN294 rectifiers connected in the bridge rectifier circuit shown the output direct voltage was 66 volts. Obviously the turns ratio of the transformer determines output voltage and the reactance values thereof in conjunction with the feedback factor determine the natural oscillation frequency of the circuit, and these may be varied as may the circuit constants and specific components used. In one example a converter using printed circuit techniques weighed one ounce and produced 0.5 watt at 66 volts with an operating efficiency of 70%.

The foregoing and other aspects of the invention will be evident to those skilled in this art.

I claim as my invention:

1. Circuit means for converting direct voltage into alternating voltage, comprising a source of direct voltage, a transformer having a pair of primaries, a secondary, and two pairs of feedback windings, two pairs of transistors respectively associated with said pairs of feedback windings, each transistor having a set of load electrodes and a set of control electrodes, the load electrodes of each transistor of a pair being connected in parallel and with like polarity with the load electrodes of a corresponding transistor of the other pair and both in series with said source and with one of said primaries, whereby direct current thus permitted to flow through said primaries produces mutually opposing magnetizing forces in said transformer, the control electrodes of the transistors of each pair being connected with like polarity in series with said source and each separately in series with a different one of the windings of the pair of feedback windings associated with such pair of transistors, the feedback windings of each such pair being connected with relatively opposite polarity, and bias resistance means for each such transistor, connected in series with the control electrodes thereof and said source, the connections between said transistors and transformer windings producing circuit oscillations and pulsating current of relatively opposite phasing in said transformer primaries.

2. The circuit means defined in claim 1, wherein opposite-polarity ends of the windings of each pair of feedback windings are connected together and wherein the bias resistance means for the pairs of transistors associated with the respective pairs of feedback windings comprise a common resistance connected between one side of said source and the interconnected ends of each such pair of feedback windings.

3. The circuit means defined in claim 2, wherein the transformer primaries comprise the halves of a single center-tapped primary and wherein the two pairs of feedback windings comprise the respective halves of two center-tapped windings.

4. The circuit means defined in claim 2, and rectifier means connected across the transformer secondary to produce direct voltage, said rectifier means being connected in series with the direct voltage source, whereby the voltage of the latter adds to the rectified voltage to produce a resultant output direct voltage.

References Cited in the file of this patent

UNITED STATES PATENTS

| | | |
|---|---|---|
| 2,662,199 | Van Doorn | Dec. 8, 1953 |
| 2,728,857 | Sziklai | Dec. 27, 1955 |
| 2,748,274 | Pearlman | May 29, 1956 |
| 2,763,734 | Mulder | Sept. 18, 1956 |
| 2,774,878 | Jensen | Dec. 18, 1956 |
| 2,783,384 | Bright et al. | Feb. 26, 1957 |
| 2,821,639 | Bright et al. | Jan. 28, 1958 |
| 2,821,657 | Newhouse | Jan. 28, 1958 |
| 2,891,195 | Smyth | June 16, 1959 |

OTHER REFERENCES

Electronics Engineering, February 1957; page 87.